United States Patent
Lau (10) Patent No.: US 11,246,774 B2
(45) Date of Patent: Feb. 15, 2022

(54) SMART ELECTRIC WHEELCHAIR FOR THE ELDERLY

(71) Applicant: Ming Ho Lau, Shatin (HK)

(72) Inventor: Ming Ho Lau, Shatin (HK)

(*) Notice: Subject to any disclaimer, the term of this patent is extended or adjusted under 35 U.S.C. 154(b) by 311 days.

(21) Appl. No.: 16/431,020

(22) Filed: Jun. 4, 2019

(65) Prior Publication Data
US 2020/0268577 A1    Aug. 27, 2020

(30) Foreign Application Priority Data
Feb. 26, 2019  (HK) .................................. 19120034.4

(51) Int. Cl.
| *A61G 5/14* | (2006.01) |
| *A61G 5/04* | (2013.01) |
| *G05D 1/02* | (2020.01) |
| *A61G 5/06* | (2006.01) |
| *A61G 5/12* | (2006.01) |

(52) U.S. Cl.
CPC ............... *A61G 5/14* (2013.01); *A61G 5/041* (2013.01); *A61G 5/066* (2013.01); *A61G 5/125* (2016.11);
(Continued)

(58) Field of Classification Search
CPC .......... A61G 5/14; A61G 5/046; A61G 5/125; A61G 5/066; A61G 5/085; A61G 5/068;
(Continued)

(56) References Cited

U.S. PATENT DOCUMENTS

| 5,020,818 A | * | 6/1991 | Oxford | ................... A61G 5/025 |
| | | | | 280/250.1 |
| 6,125,957 A | * | 10/2000 | Kauffmann | .............. A61G 5/14 |
| | | | | 180/65.1 |

(Continued)

FOREIGN PATENT DOCUMENTS

| CN | 103315861 B | 2/2016 |
| CN | 106667682 A | 5/2017 |
| CN | 108272604 A | 7/2018 |
| CN | 108897328 A | 11/2018 |
| CN | 208447952 U | 2/2019 |
| WO | WO2009107909 A1 | 9/2009 |

*Primary Examiner* — Minnah L Seoh
*Assistant Examiner* — Harold Eric Pahlck, III
(74) *Attorney, Agent, or Firm* — Muncy, Geissler, Olds & Lowe, P.C.

(57) ABSTRACT

The present invention is a smart electric wheelchair for the elderly, which comprises a battery for power supply and a control system for integrally controlling the electric wheelchair, and also comprises a body bracket, wherein the bottom of the body bracket is connected with a standing platform for a user to stand, a driving unit is provided on each side of the standing platform to drive the electric wheelchair; and a foldable seat is provided in the middle of the body bracket, and an armrest is provided on each side of the seat, with at least one of the armrests provided with a controller for controlling the entire electric wheelchair. The electric wheelchair is provided with a plurality of sensors which include a ranging and positioning sensor and/or an obstacle avoidance sensor, and further include an identification sensor, wherein the identification sensor identifiably corresponds to a one-to-one mobile identification device worn by a user, so that the electric wheelchair can automatically follow the user's position according to the collaboration between the mobile identification device and the sensor. The present invention solves the drawbacks of existing similar apparatuses and gives the elderly a better use experience, showing both practical and economical significance.

9 Claims, 8 Drawing Sheets

(52) U.S. Cl.
 CPC ... *G05D 1/0212* (2013.01); *G05D 2201/0206* (2013.01)

(58) Field of Classification Search
 CPC ............... A61G 5/06; A61G 5/1049; G60D 2201/0206; B62D 51/02
 See application file for complete search history.

(56) References Cited

U.S. PATENT DOCUMENTS

| | | | |
|---|---|---|---|
| 6,446,742 B1* | 9/2002 | Wilson | A61G 5/1091 180/65.6 |
| 8,844,961 B2* | 9/2014 | Hunziker | A61G 5/14 280/304.1 |
| 9,173,792 B2* | 11/2015 | Goffer | A61G 7/1053 |
| 9,301,893 B1* | 4/2016 | Wu | A61G 5/0833 |
| 9,629,762 B2* | 4/2017 | Aviv | A61G 5/04 |
| 2015/0034402 A1* | 2/2015 | Dourado | A45F 3/04 180/181 |
| 2015/0084289 A1 | 3/2015 | Hyde et al. | |
| 2015/0094879 A1* | 4/2015 | Pari | B25J 5/007 701/2 |
| 2019/0083336 A1* | 3/2019 | Norris, Jr. | A61G 5/1056 |
| 2021/0154064 A1* | 5/2021 | Kim | A61G 5/1094 |

\* cited by examiner

SMART ELECTRIC WHEELCHAIR FOR THE ELDERLY

TECHNICAL FIELD

The present invention relates to a wheelchair, particularly to a smart electric wheelchair for the elderly.

BACKGROUND ART

The aging of the population has become a serious global problem. After retirement, silver-haired elders may experience gradual deterioration of the walking ability from walking around fast and vigorously, then limited walking, finally to moving around in a wheelchair. This long process shortens the reachable distance of the elderly gradually.

Commonly used equipment for solving the above problems of the elderly in the prior art are electric wheelchairs and scooters specific to the elderly. However, for the elderly who are still able to walk, use of such wheelchairs or scooters may give them a bad feeling of being physically weak or disabled. Furthermore, the elderly in wheelchairs definitely have a lower level of sight line than that when they walk, which will affect and reduce their visual field, and make them feel "being inferior to others" in an indirect manner. Therefore, many elderly people with a limited walking ability are reluctant and unwilling to use wheelchairs or scooters as a means of transportation.

No matter in the United States, mainland China and Hong Kong, or even throughout the world, it is now aging times of post-war baby boomers, and silver-haired elders will definitely increase in the next two or three decades. They all have a strong economic ability and a decent social status, and also pay great attention to health and even their image. As aging is inevitable, the elderly's walking ability will gradually weaken, and the reachable distance will keep shrinking. The elderly with a limited walking ability need equipment to help maintain or even increase their reachable distance. Such equipment may also satisfy the physical and psychological needs of the elderly or those who have an insufficient physical fitness.

SUMMARY

The main technical problem to be solved by the present invention is to provide a brand-new smart electric wheelchair for the elderly so as to overcome the defects in the prior art.

The technical means adopted by the present invention is as follows: disclosing a smart electric wheelchair for the elderly, which comprises a battery for power supply and a control system for integrally controlling the electric wheelchair, and also comprises a body bracket, wherein the bottom of the body bracket is connected with a standing platform for a user to stand, and a driving unit is provided on each side of the standing platform to drive the electric wheelchair; a foldable seat is provided in the middle of the body bracket, and an armrest is provided on each side of the seat, with at least one of the armrests provided with a controller for controlling the whole electric wheelchair.

At least two wheels are provided for the driving unit on each side, and at least one of the wheels is a driving wheel which is connected with an independently operating motor.

The wheels may be in direct contact with the ground, or a track may be connected with the outer side of the wheels.

The driving unit on each side is provided with a front wheel, a middle wheel and a rear wheel in sequence from front to back, wherein the wheels may be separately or simultaneously driven by the motor.

The body bracket is located above the seat and connected with a backrest, with a slide guide provided for the body bracket on each side of the backrest. The armrest is slidably connected with the slide guide so that the armrest can slide up and down along the slide guide.

The body bracket and the slide guides are connected to the standing platform through a rotatable structure so that the body bracket and the slide guides can be rotatably folded onto the standing platform.

An electric retractable extension plate with a flat plate structure is provided at the bottom of the standing platform.

An electric extension component is provided at the top or bottom of the standing platform, wherein the electric extension component consists of a cross bar and a vertical bar, the vertical bar is with a telescopic structure connected with a driving motor at the back end and with the cross bar at the front end, and a depth sensor and ground-touching wheels which can be laid down and retracted are provided under the cross bar, wherein the electric extension component is with a T-shaped structure.

The electric wheelchair is provided with a plurality of sensors which include a ranging and positioning sensor and/or an obstacle avoidance sensor, and further include an identification sensor, wherein the identification sensor identifiably corresponds to a one-to-one mobile identification device worn by a user, so that the electric wheelchair can automatically follow the user's actions according to the collaboration between the mobile identification device and the sensor.

The controller is provided with a 360-degree controlling rocker and a plurality of buttons.

The beneficial effects of the present invention are as follows:

Compared with commercially available electric wheelchairs and scooters for the elderly, the present invention does not give users (the elderly) or onlookers any bad feeling of being old and weak, and the elderly are about 80 mm higher when standing on the wheelchair than standing on the ground, thus reducing their unpleasantness.

The elderly living alone often face a problem of carrying heavy weights when they go shopping, and a "FOLLOW ME" function will bring an actual benefit of handling to the elderly and bring fun to the elderly.

The elderly may easily choose a standing or sitting mode according to their physical condition. As the age increases, the elderly may change their preference from standing mode to sitting mode or alternate between the two modes at any time. The present invention can meet such switching needs without any additional expenditure. This wheelchair can be used for these three purposes for a long time, showing both practical and economical significance.

DETAILED DESCRIPTION

Figure 1:
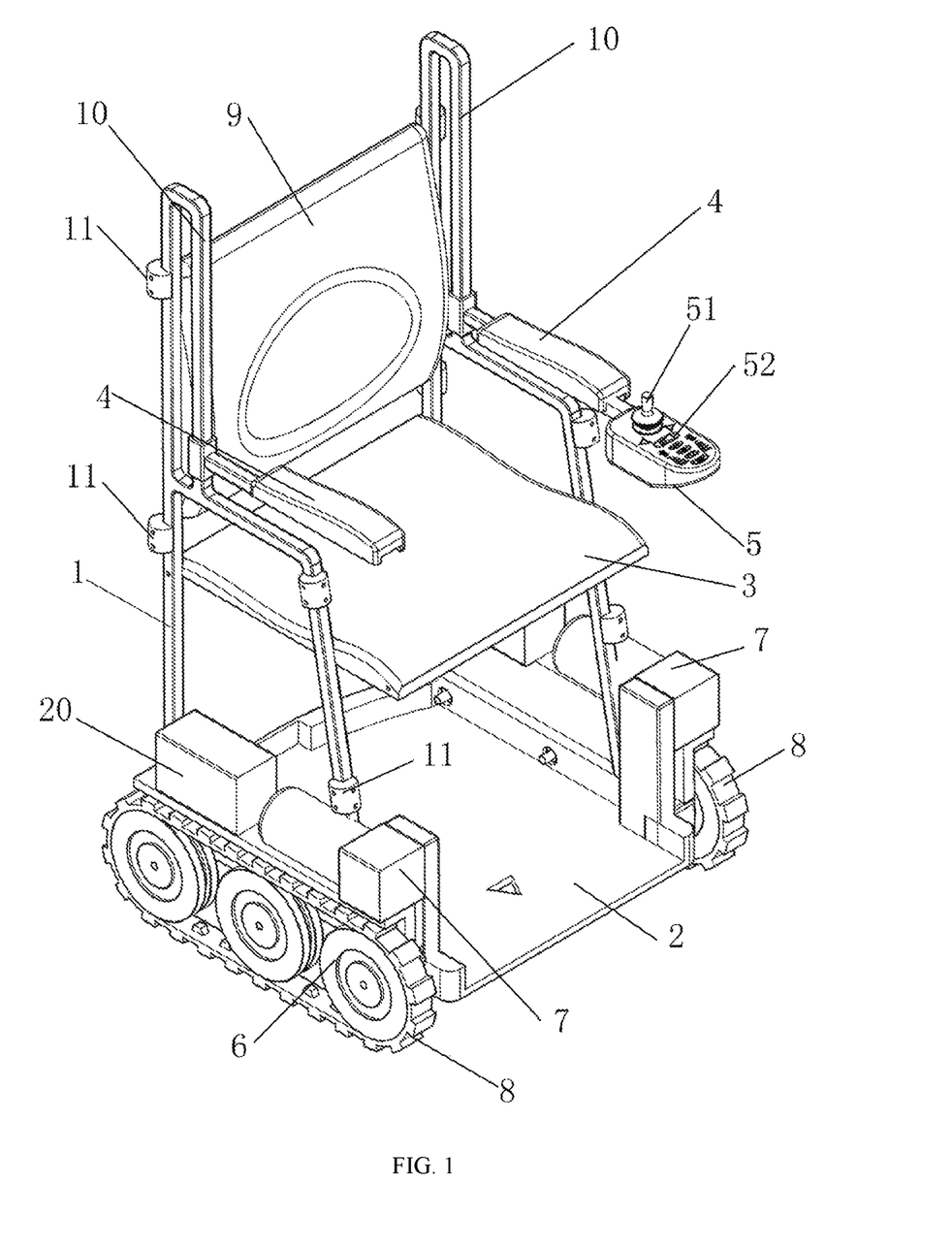
FIG. 1 is a perspective structural diagram of an embodiment of the present invention with its seat laid down.
Figure 2:
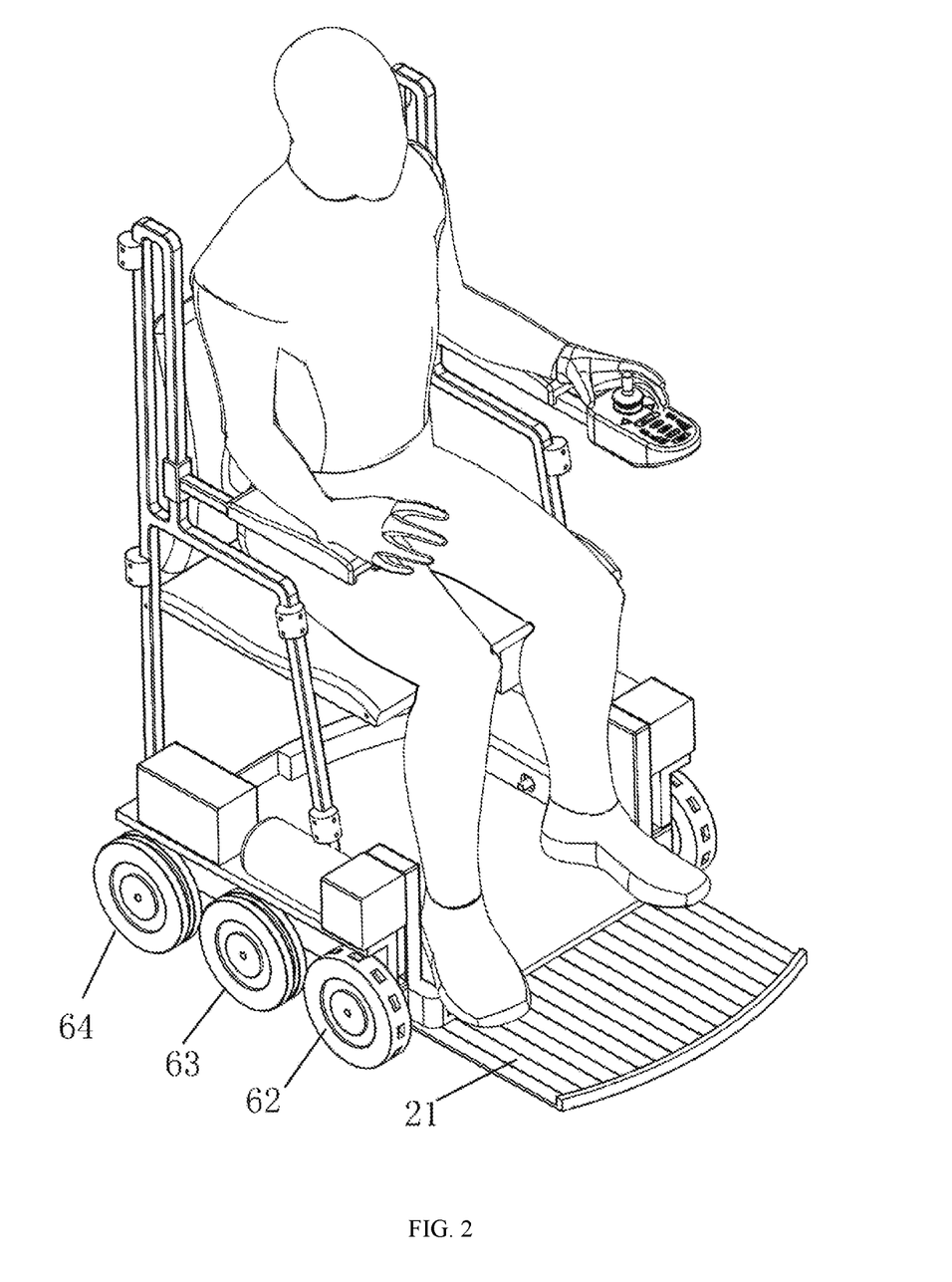
FIG. 2 is a perspective structural diagram of an embodiment of the present invention in which a user sits.
Figure 3:
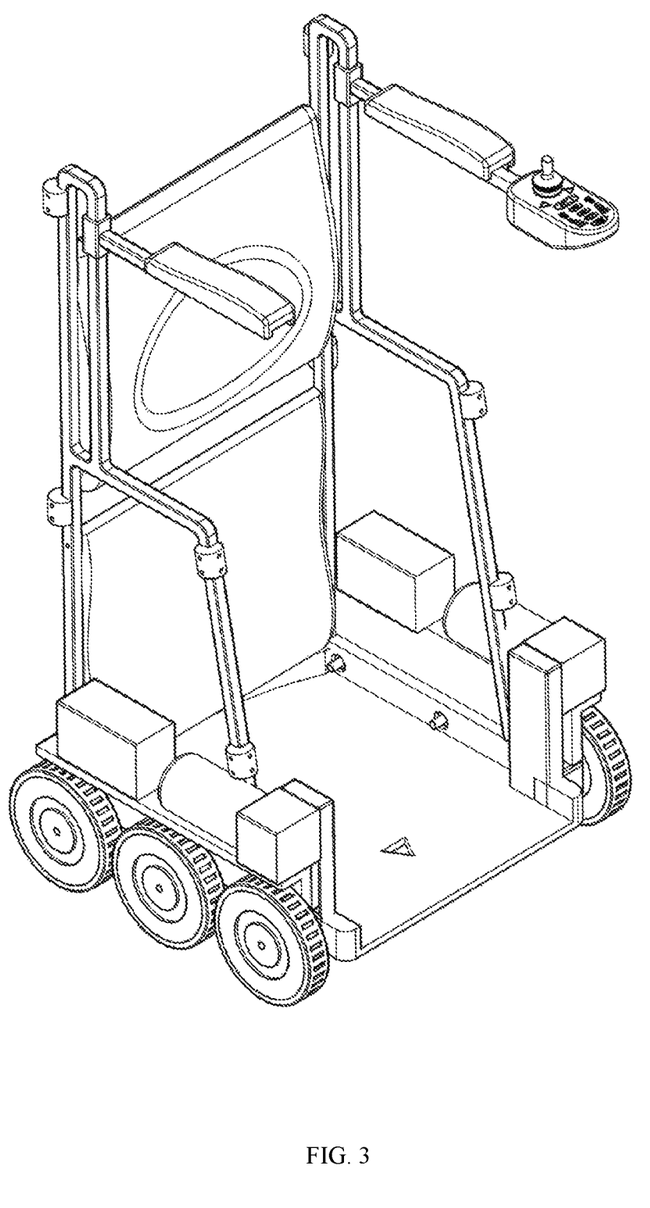
FIG. 3 is a perspective structural diagram of an embodiment of the present invention with the seat folded up.
Figure 4:
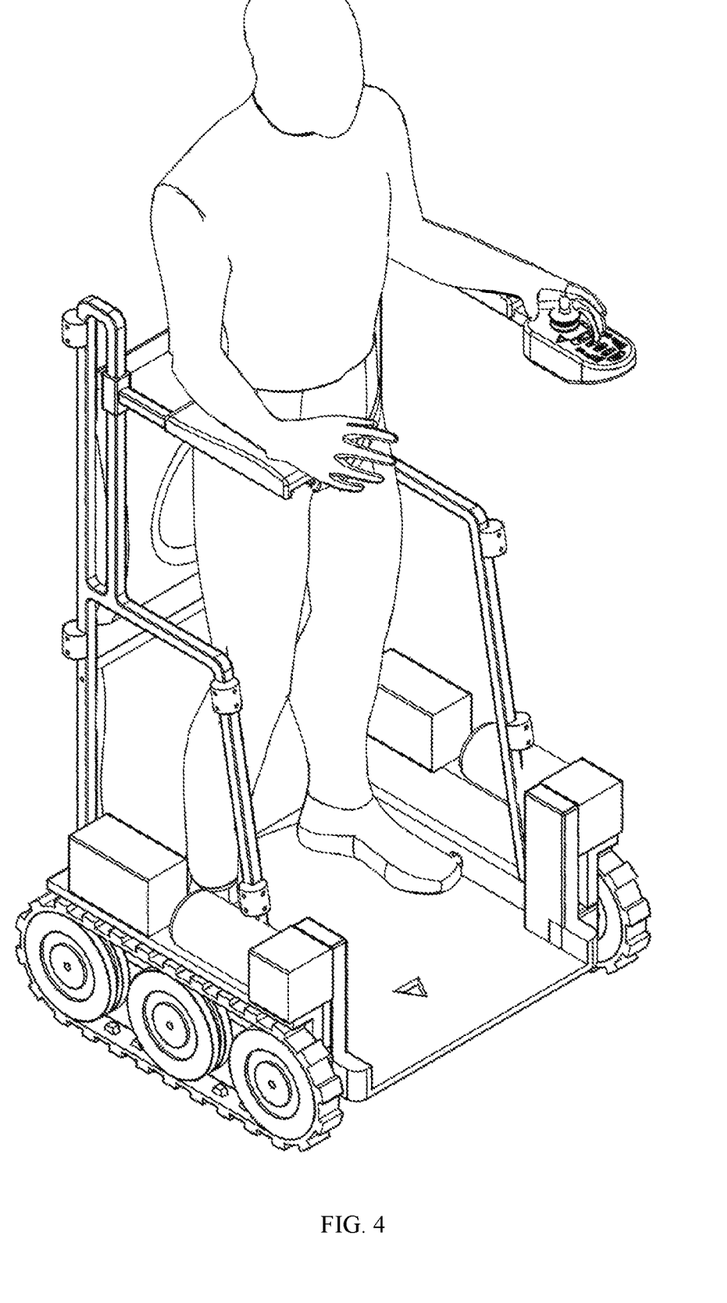
FIG. 4 is a perspective structural diagram of an embodiment of the present invention in which a user stands.

As shown in FIGS. 1-7, the present invention discloses a smart electric wheelchair for the elderly, comprising a battery for power supply and a control system for integrally controlling the electric wheelchair. The battery 20 may be selected from a variety of the existing batteries, such as a lead acid battery or a lithium battery, and the number and position may also be determined as needed. The key point is that the present invention comprises a body bracket 1, wherein the bottom of the body bracket 1 is connected with a standing platform 2 for a user to stand, and a driving unit is provided on each side of the standing platform 2 to drive the electric wheelchair; and a foldable seat 3 is provided in the middle of the body bracket 1, so that, with the structure of the standing platform 2 and the foldable seat 3, the elderly may select a standing or sitting mode according to the physical condition when using the present invention. That is, when the elderly need to stand up, as shown in FIG. 3 and FIG. 4, they may fold up the seat 3 and directly stand on the electric wheelchair to use it; when the elderly need to sit down, as shown in FIG. 1 and FIG. 2, they may lay down the seat 3 and sit on the electric wheelchair to use it as an ordinary wheelchair. The wheelchair, with a simple and reliable structure, may be easily switched between the modes at any time. An armrest 4 is provided on each side of the seat 3 for the elderly to hold, with at least one of the armrests 4 provided with a controller 5 for controlling the whole electric wheelchair. The controller 5 can be used for implementing various electric control functions of the electric wheelchair, wherein the controller is connected with the battery and the control system, which may be implemented by those skilled in the art, so no detailed descriptions are given here.

For ease of use, in this embodiment, the controller 5 is provided with a 360-degree controlling rocker 51 and a plurality of buttons 52, wherein the 360-degree controlling rocker 51 can be used to control the direction of movement as well as forward and backward movements. The buttons may include a turn-right-on-the-spot button, a turn-left-on-the-spot button, a power button, a horn button, an acceleration button, a deceleration button, a "FOLLOW ME" mode button, and may also include a charging and power indicator, a speed indicator and a battery charging interface, etc., which may be added or removed as needed.

In the electric wheelchair of the present invention, at least two wheels 6 are provided for the driving unit on each side, and at least one of the wheels 6 is a driving wheel which is connected with an independently operating motor 7. A track 8 may also be provided over the outer side of the wheels to enhance the passing performance of the electric wheelchair. The motor 7 here may be a direct-current motor which separately controls the wheels or the track-driven wheels on the left and right sides, respectively. The motor 7 may be connected with the battery 20.

In the embodiments shown in FIGS. 1-7, the driving unit on each side is provided with a front wheel 62, a middle wheel 63 and a rear wheel 64 in sequence from front to back, wherein the wheels may be separately or simultaneously driven by the motor. Since the designed application sites of the electric wheelchair in the present invention include places where there are a lot of people (such as shopping malls and restaurants), the steering radius must be small, and the amplitude of the front sway or tail sway is minimized during steering to avoid collision with objects or human bodies around it. Ideally, an ability to turn on the spot (steering radius=0) is provided. The optimal solution to this is that middle wheels are used for driving when no track is provided. For example, when the left middle wheel moves forward, the right middle wheel moves backward simultaneously, and the other wheels are free to swing, so that steering on the spot can be realized. Secondly, another preferred solution is that front wheels are used for driving and steering when no track is provided, and rear wheels are free to swing, or rear wheels are used for driving and steering, and front wheels are free to swing.

The body bracket 1 of the present invention is located behind the seat 3 and the upper part of the body bracket 1 is connected with a backrest 9, with a slide guide 10 provided for the body bracket 1 on each side. The armrest 4 is slidably connected with the slide guide 10 so that the armrest 4 can slide up and down along the slide guide 10. Such sliding may be up and down sliding manually controlled, or electrically controlled, even linked with the position of the seat 3. For example, if the elderly use a sitting mode and the seat 3 is laid flatwise, the armrests 4 slide to a lower position; when the elderly use a standing mode and the seat 3 stands up, the armrests 4 slide to a suitable height in the upper part, making a user feel more comfortable and convenient. Similarly, the sliding structure may also be applied to the seat 3, allowing a user to adjust the height of the seat 3 as needed.

Figure 5:
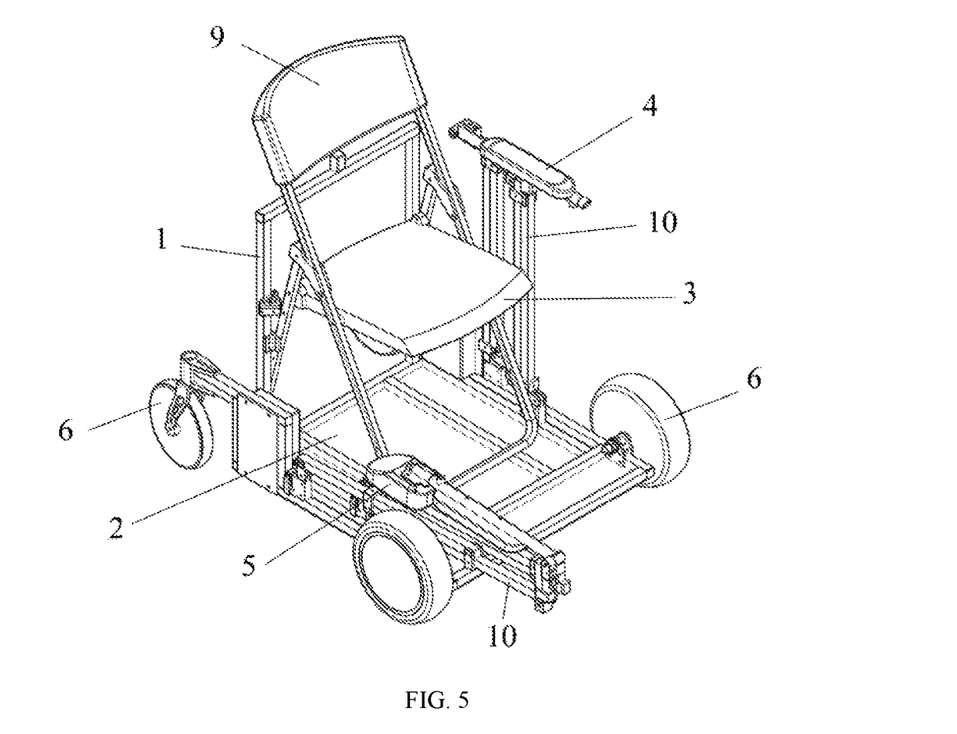
FIG. 5 is a perspective structural diagram of an embodiment of the present invention with its slide guides folded up.
Figure 6:
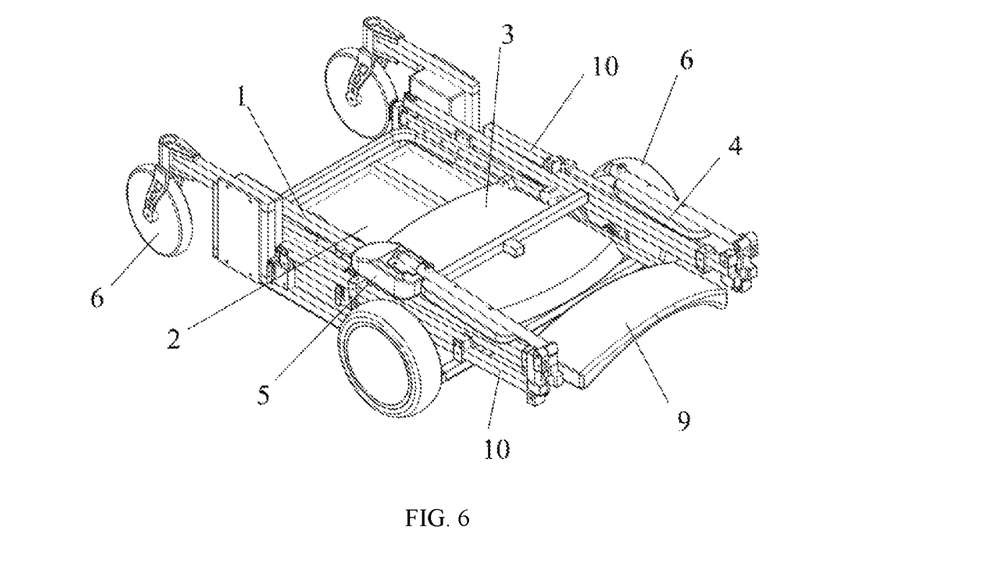
FIG. 6 is a perspective structural diagram of an embodiment of the present invention with its body bracket folded up.
Figure 7A:
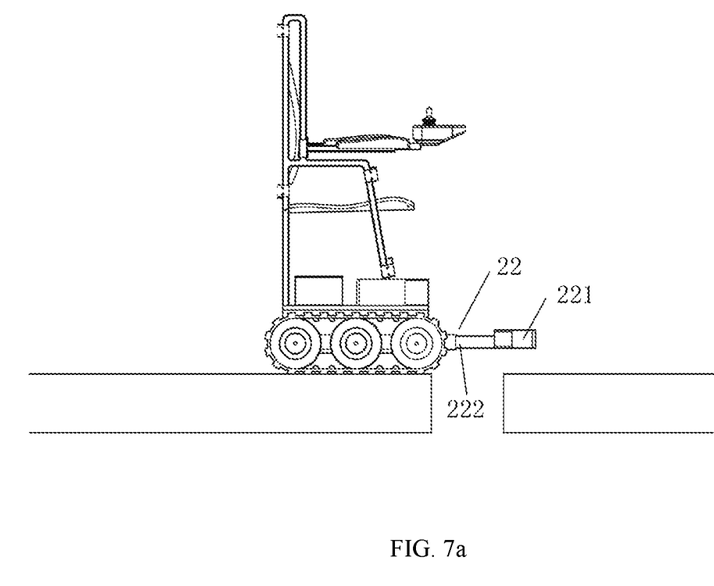
FIG. 7*a* and FIG. 7*b* are side structural diagrams of an embodiment of the present invention utilizing the electric extension component with a T-shaped structure to cross a gap, wherein the ground-touching wheels are not laid down in FIG. 7*a* and the ground-touching wheels are laid down in FIG. 7*b*.
Figure 7B:
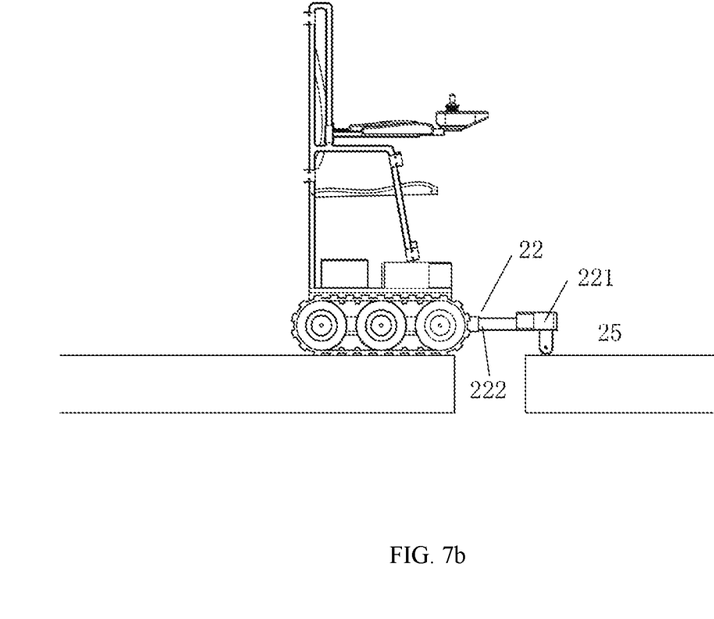
Figure 7C:
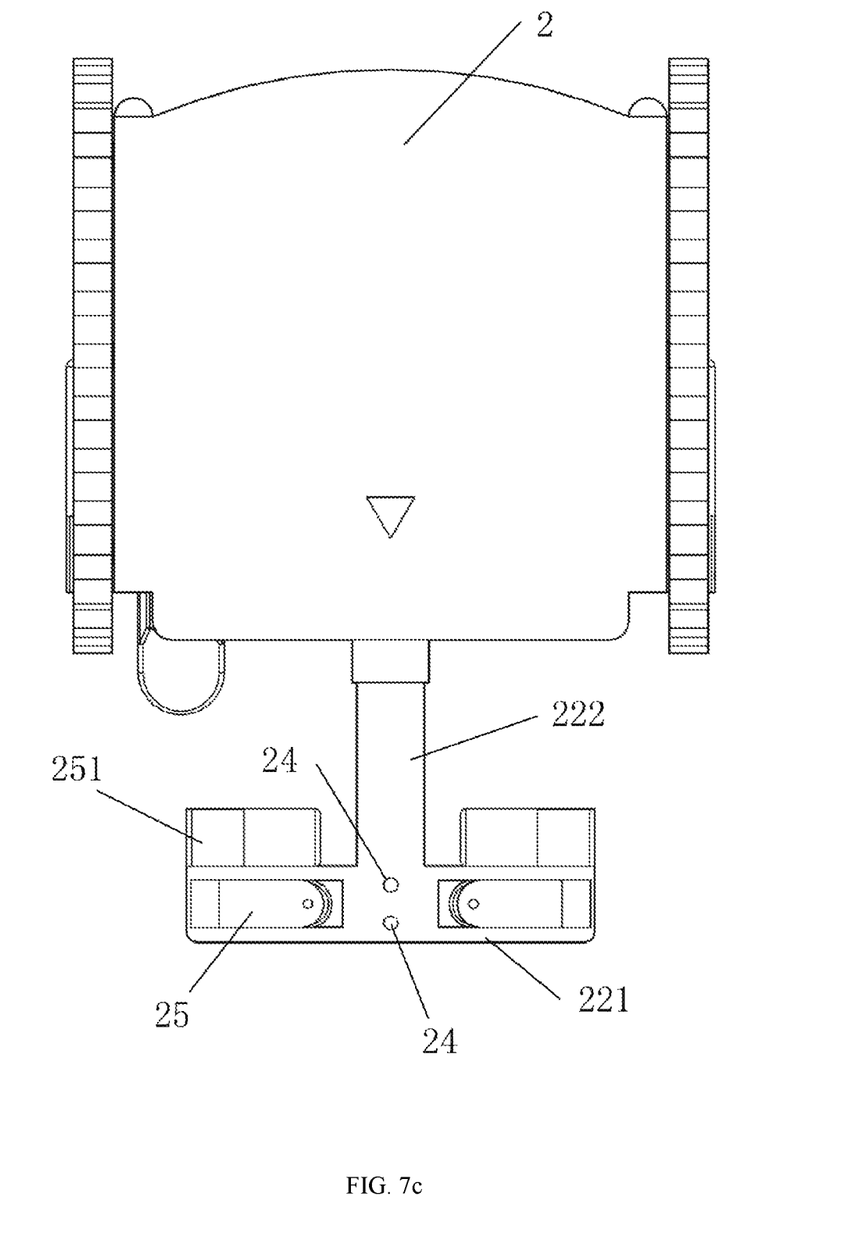
FIG. 7*c* is a bottom structural diagram of the electric extension component with a T-shaped structure for an embodiment of the present invention in an extended state.
Figure 8:
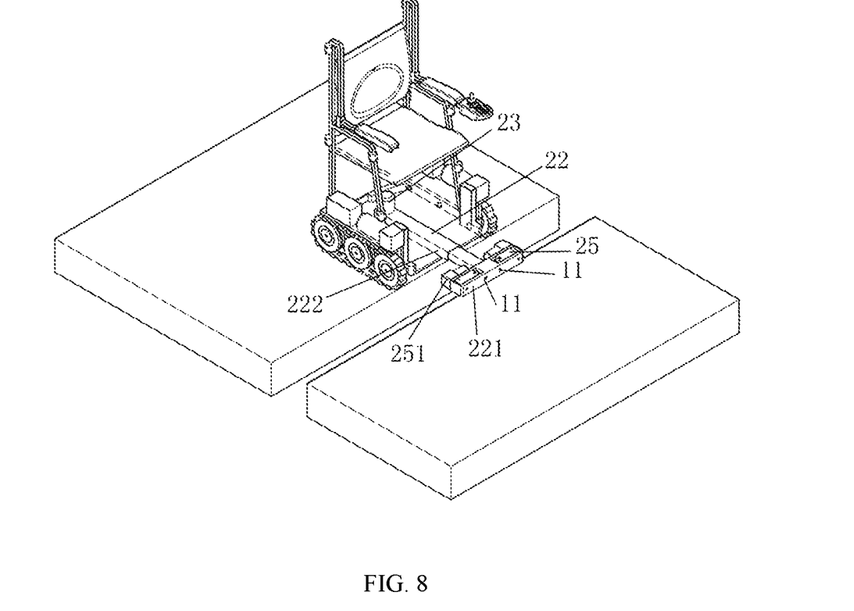
FIG. 8 is a perspective structural diagram of an embodiment of the present invention utilizing the electric extension component with a T-shaped structure to cross a gap.
Figure 9:
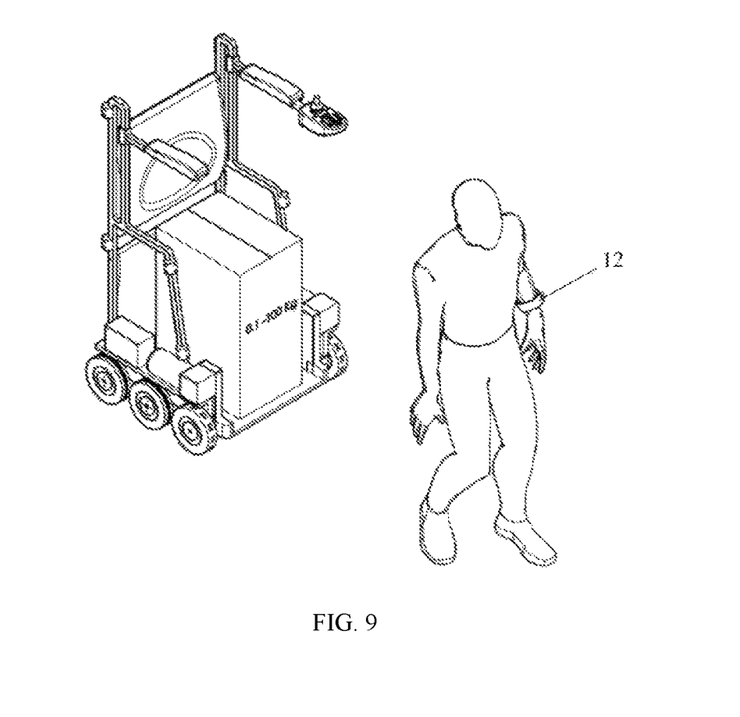
FIG. 9 is a perspective structural diagram of the present invention used for transporting goods when a "FOLLOW ME" function is implemented.

As shown in FIG. 5 and FIG. 6, the present invention further provides another preferred embodiment, wherein a foldable seat 3 is provided in the middle of the body bracket 1, and the seat 3 is connected with the bracket 1 in such a way that the seat is enabled to move up and down in order to allow a user to adjust the height of the seat; a backrest 9 is connected with the upper part of the body bracket 1, a slide guide 10 is provided on each side of the body bracket 1, an armrest 4 is connected with the slide guide 10, and each of the armrests 4 is provided with a rotatable structure so that the armrest 4 can be folded towards the slide guide 10. In this embodiment, both the body bracket 1 and the slide guides 10 are connected with the standing platform 2 through a rotatable structure, so that the body bracket 1 and the slide guides 10 can be folded onto the standing platform 2, thus enabling the seat 3, the backrest 9 and the armrests 4 to be folded and stacked on the standing platform 2. The rotatable structure mentioned in this embodiment may be a hinge or the like known in the art to realize the rotation and locking of the components. FIG. 5 shows that the slide guide 10 on the right side is folded onto the standing platform 2, wherein the controller 5 provided on the armrest 4 is also folded together. FIG. 6 shows a folded state of the smart electric wheelchair for the elderly in this embodiment, in which the occupied space is significantly reduced, being convenient for handling and storage.

As shown in FIG. 2, an electric retractable extension plate 21 with a flat plate structure is provided at the bottom of the standing platform 2 in the present invention. The electric extension plate can be activated to extend out of the bottom standing platform 2 when needed, thereby increasing the area for contacting the ground before the wheelchair, so that, when necessary, for example, entering a subway car across a gap from a subway station, the electric extension plate is activated, and then the electric wheelchair in the present invention can enter a car safely by itself, so a platform attendant does not have to place a gangplank to provide help, which is very convenient.

As shown in FIGS. 7a, 7b, 7c and 8, the present invention further provides another preferred embodiment: an electric extension component 22 is provided at the top or bottom of the standing platform 2 (in the present embodiment, it is provided at the top). The electric extension component 22 consists of a cross bar 221 and a vertical bar 222, wherein the vertical bar 222 is with a telescopic structure connected with a driving motor 23 at the back end and with the cross bar 221 at the front end; a depth sensor 24 and ground-touching wheels 25 which can be laid down and retracted are provided under the cross bar 221. The ground-touching wheels are not laid down shown in FIG. 7a, and the ground-touching wheels are laid down in FIG. 7b. The ground-touching wheel 25 may also be driven by an independent motor 251. In use, when a gap is encountering a gap, the electric extension component 22 is extended out, and the depth sensor 24 under the cross bar 221 operates. If the depth is too large, the extension component is further extended; when the cross bar 221 continues to move forward, and the depth sensor 24 detects the ground below it, the ground-touching wheels 25 are extended out to press against the ground, so that the entire electric wheelchair can move forward and cross the gap, and then the T-shaped electric extension component 22 is folded up. This entire operation may be manually performed by a controller 5 or automatically done by a variety of sensors.

The electric extension component 22 in the present invention may be a cross-shaped structure in addition to the T-shaped structure as shown in FIG. 7a, 7b, 7c and 8, or may be composed of various numbers of cross bars and vertical bars as needed, such as a octothorpe-shaped structure.

The electric wheelchair may be provided with a plurality of sensors 11 which include a ranging and positioning sensor and/or an obstacle avoidance sensor. These sensors may be, as shown in FIG. 1, provided at a plurality of positions of the electric wheelchair, or as shown in FIG. 6, provided at the front end of the cross bar 221 of the electric extension component 22 with a T-shaped structure. The sensors 11 may further include an identification sensor, wherein the identification sensor identifiably corresponds to a one-to-one mobile identification device 12 worn by a user, so that the electric wheelchair can automatically follow the user's actions according to the collaboration between the mobile identification device and the sensor. The mobile identification device can be a wristband, a mobile phone or a smart watch.

With a variety of sensors, the "FOLLOW ME" function can be achieved in the present invention.

The sensors may be installed at different heights and directions of the electric wheelchair to detect obstacles and their distances. The elderly need to wear a signal transceiver or signal beacon, such as a watch, a wristband or a smart phone. The electric wheelchair can use the sensors on the wheelchair to detect and measure the relative direction and distance of the elderly, and then move closer to the elderly straightly. When arriving at a predetermined distance from the elderly (such as 1 meter), the electric wheelchair will stop; if the elderly continue to walk away from the electric wheelchair to another distance (such as 2 meters), the electric wheelchair will restart and continue to move closer to the elderly. If the electric wheelchair detects an obstacle in the direction of advancement, it will immediately slow down or stop. If the obstacle remains stationary, the electric wheelchair will turn left or right to avoid the obstacle and continue to advance according to the information of the sensors. If the electric wheelchair can't find a way out, it will stop and make a sound and a signal to inform the elderly to ask for assistance. This function may also be used to help a user transport goods as shown in FIG. 7.

The main function of the ranging and positioning sensor/obstacle avoidance sensor for achieving the functions above is to detect the distance and direction of obstacles nearby. Viable options are as follows:

LiDAR
Ultrasonic sensor
Infrared proximity sensor/distance sensor
GPS sensor
Stereoscopic imaging
Kinect 3D imaging
WiFi access point
Li-Fi visible light communication
Ultra wide band signal The main function of the identification sensor for achieving the functions above is to determine that the electric wheelchair has a one-to-one identification with a user, and the user must wear it on the body. Viable options are as follows:

Beacon infrared
Bluetooth iBeacon
Smart phone
Ultra wide band beacon
Smart wristband
Smart watch Considering the accuracy, reliability, price and power consumption of the sensors, the following sensors are preferably used for the electric wheelchair in the present invention:

Ranging and positioning sensor/obstacle avoidance sensor:
Ultrasonic sensor and/or;
Infrared proximity sensor/distance sensor and/or;
LiDAR and/or;
GPS sensor and/or;
Ultra wide band signal;
Identification sensor:
Beacon infrared and/or;
Bluetooth iBeacon and/or;
Smart phone GPS sensor and/or;
Smart phone Bluetooth sensor and/or;
Ultra wide band beacon.

The technologies above are all existing mature technologies and may be conveniently and reliably applied in the present invention.

The "FOLLOW ME" function and the on-the-spot steering function of the present invention above may also be applied and installed on an ordinary electric wheelchair, especially a front (dual) wheel-driven electric wheelchair for which similar functions may also be achieved when various sensor configurations are provided.

What is claimed is:

1. A smart electric wheelchair for the elderly, comprising a battery for power supply and a control system for integrally controlling the electric wheelchair, wherein the electric wheelchair comprises a body bracket, wherein the bottom of the body bracket is connected with a standing platform for a user to stand, and a driving unit is provided on each side of the standing platform to drive the electric wheelchair; and a foldable seat is provided in the middle of the body bracket, and an armrest is provided on each side of the seat, with at least one of the armrests provided with a controller for controlling the entire electric wheelchair;

wherein an electric retractable extension plate with a flat plate structure is provided at the bottom of the standing platform.

2. The smart electric wheelchair for the elderly as described in claim 1, wherein at least two wheels are provided for the driving unit on each side, and at least one of the wheels is a driving wheel which is connected with an independently operating motor.

3. The smart electric wheelchair for the elderly as described in claim 2, wherein a track is connected with the outer side of the wheels.

4. The smart electric wheelchair for the elderly as described in claim 2, wherein the driving unit on each side is provided with a front wheel, a middle wheel and a rear wheel in sequence from front to back, wherein the wheels may be separately or simultaneously driven by the motor.

5. The smart electric wheelchair for the elderly as described in claim 1, wherein the body bracket is located above the seat and connected with a backrest, with a slide guide provided for the body bracket on each side of the backrest, and the armrest is slidably connected with the slide guide so that the armrest can slide up and down along the slide guide.

6. The smart electric wheelchair for the elderly as described in claim 5, wherein the body bracket and the slide guides are connected to the standing platform through a rotatable structure so that the body bracket and the slide guides can be rotatably folded onto the standing platform.

7. A smart electric wheelchair for the elderly comprising a battery for power supply and a control system for integrally controlling the electric wheelchair, wherein the electric wheelchair comprises a body bracket, wherein the bottom of the body bracket is connected with a standing platform for a user to stand, and a driving unit is provided on each side of the standing platform to drive the electric wheelchair; and a foldable seat is provided in the middle of the body bracket, and an armrest is provided on each side of the seat, with at least one of the armrests provided with a controller for controlling the entire electric wheelchair;

wherein an electric extension component is provided at the top or bottom of the standing platform, wherein the electric extension component consists of a cross bar and a vertical bar, the vertical bar is with a telescopic structure connected with a driving motor at the back end and with the cross bar at the front end, and a depth sensor and ground-touching wheels which can be laid down and retracted are provided under the cross bar.

8. The smart electric wheelchair for the elderly as described in claim 1, wherein the electric wheelchair is provided with a plurality of sensors which include a ranging and positioning sensor and/or an obstacle avoidance sensor, and further include an identification sensor, wherein the identification sensor identifiably corresponds to a one-to-one mobile identification device worn by a user, so that the electric wheelchair can automatically follow the user's actions according to the collaboration between the mobile identification device and the sensor.

9. The smart electric wheelchair for the elderly as described in claim 1, wherein the controller is provided with a 360-degree controlling rocker and a plurality of buttons.

* * * * *